United States Patent
Baick

(10) Patent No.: US 11,606,581 B2
(45) Date of Patent: Mar. 14, 2023

(54) METHOD, SYSTEM, AND NON-TRANSITORY COMPUTER-READABLE RECORD MEDIUM FOR CANCELLING DELAY OF GUEST BROADCASTING IN LIVE BROADCAST

(71) Applicant: LINE Plus Corporation, Seongnam-si (KR)

(72) Inventor: Joonsick Baick, Seongnam-si (KR)

(73) Assignee: LINE PLUS CORPORATION, Gyeonggi-do (KR)

(*) Notice: Subject to any disclaimer, the term of this patent is extended or adjusted under 35 U.S.C. 154(b) by 0 days.

(21) Appl. No.: 17/031,072

(22) Filed: Sep. 24, 2020

(65) Prior Publication Data
US 2021/0006841 A1    Jan. 7, 2021

Related U.S. Application Data

(63) Continuation of application No. PCT/KR2018/003662, filed on Mar. 28, 2018.

(51) Int. Cl.
*H04N 21/2187* (2011.01)
*H04N 21/233* (2011.01)
*H04N 21/2343* (2011.01)
*H04N 21/431* (2011.01)
*G06T 11/00* (2006.01)

(52) U.S. Cl.
CPC ......... *H04N 21/2187* (2013.01); *G06T 11/00* (2013.01); *H04N 21/2335* (2013.01); *H04N 21/2343* (2013.01); *H04N 21/4316* (2013.01)

(58) Field of Classification Search
CPC .......... H04N 21/2187; H04N 21/2335; H04N 21/2343; H04N 21/4316; G06T 11/00
See application file for complete search history.

(56) References Cited

U.S. PATENT DOCUMENTS

| | | | |
|---|---|---|---|
| 6,473,114 B1* | 10/2002 | Strubbe | H04N 7/15 348/E7.083 |
| 2014/0059629 A1* | 2/2014 | Oh | H04N 21/2665 725/109 |
| 2014/0351865 A1 | 11/2014 | Gresta | |
| 2017/0134831 A1* | 5/2017 | Talukder | H04L 65/1089 |

(Continued)

FOREIGN PATENT DOCUMENTS

| | | |
|---|---|---|
| CN | 105306468 A | 2/2016 |
| CN | 106131583 A | 11/2016 |
| KR | 10-2006-0120571 A | 11/2006 |

(Continued)

OTHER PUBLICATIONS

International Search Report for International Application No. PCT/KR2018/003662 dated Dec. 17, 2018.

(Continued)

*Primary Examiner* — Randy A Flynn
(74) *Attorney, Agent, or Firm* — Harness, Dickey & Pierce, P.L.C.

(57) ABSTRACT

Disclosed is a live broadcast method and apparatus that may effectively remove delay of a guest broadcast output from a guest side by generating and transmitting an audio of a host and an audio of a guest as individual elementary streams (ESs) in a simultaneous live broadcast transmitted by mixing a host broadcast stream and a guest broadcast stream.

17 Claims, 10 Drawing Sheets

(56) References Cited

U.S. PATENT DOCUMENTS

2018/0063556 A1    3/2018  Kalmanson et al.
2018/0227339 A1*   8/2018  Rodriguez .......... H04L 65/1089

FOREIGN PATENT DOCUMENTS

| KR | 10-0867004      | 11/2008 |
| KR | 10-2009-0066190 A | 6/2009 |
| KR | 10-2011-0054485 A | 5/2011 |
| KR | 10-2017-0081517 A | 7/2017 |

OTHER PUBLICATIONS

Japanese Office Action dated Apr. 5, 2022 for Japanese Patent Application No. 2020-551941.
Chinese Office Action dated Apr. 1, 2022 issued in corresponding Chinese Patent Application No. 201880091897.X.

* cited by examiner

METHOD, SYSTEM, AND NON-TRANSITORY COMPUTER-READABLE RECORD MEDIUM FOR CANCELLING DELAY OF GUEST BROADCASTING IN LIVE BROADCAST

CROSS-REFERENCE TO RELATED APPLICATIONS

This U.S. non-provisional application and claims the benefit of priority under 35 U.S.C. § 365(c) from International Application PCT/KR2018/003662, which has an International filing date of Mar. 28, 2018, the entire contents of which are incorporated herein by reference in their entirety.

BACKGROUND

Technical Field

One or more example embodiments relate to technology for removing a delay that occurs in a live broadcast.

Related Art

Currently, a media client including a live broadcast is on the rapid growth.

A host, that is, a caster may upload a live broadcast within a corresponding channel through a media client of the host and a viewer may readily view the live broadcast uploaded by the host through a media client of the viewer.

SUMMARY

Example embodiments provide a method and/or apparatus that may effectively remove delay of a guest broadcast output from a guest side by generating and transmitting an audio of a host and an audio of a guest as individual elementary streams (ESs) in a simultaneous live broadcast transmitted by mixing a host broadcast stream and a guest broadcast stream.

According to an aspect of at least one example embodiment, there is provided a live broadcast method executed at a terminal implemented as a computer system, the terminal including at least one processor configured to execute computer-readable instructions included in a memory. The live broadcast method may include, by the at least one processor, transmitting, to a host terminal through a server, a first guest screen input from an input device connected to the terminal and a first guest audio associated with the first guest screen, receiving, from the host terminal through the server, a first broadcast screen in which a first host screen input from the host terminal and the first guest screen are mixed and a first host audio associated with the first host screen and the first guest audio through respective audio elementary streams, generating a second broadcast screen by overlaying, on the received first broadcast screen, a second guest screen input from the input device of the terminal after the first guest screen, and playing the first host audio and the second broadcast screen together without playing the first guest audio.

The generating may include overlaying the input second guest screen on an area on which the first guest screen is displayed on the received first broadcast screen, and the playing may include generating a guest broadcast audio by mixing a second guest audio associated with the second guest screen input from the input device and the received first host audio, and playing the guest broadcast audio and the second broadcast screen together.

The receiving may include receiving, as a video stream of a live broadcast, the first broadcast screen in which the first host screen and the second guest screen are mixed through a single video elementary stream, and receiving, as an audio stream of the live broadcast, the first host audio and the first guest audio through the respective audio elementary streams.

The live broadcast transmitted from the host terminal may include another guest screen from another terminal that is mixed with the guest broadcast and the host broadcast, and the receiving may include further receiving, as another audio stream of the live broadcast, another guest audio associated with the another guest screen through another audio elementary stream different from the respective audio elementary streams.

The playing may include controlling whether to play at least one of the respective audio elementary streams with respect to the live broadcast.

The playing may include controlling whether to play at least one of the respective audio elementary streams and the another audio elementary stream with respect to the live broadcast.

According to an aspect of at least one example embodiment, there is provided a live broadcast method executed at a terminal implemented as a computer system, the terminal including at least one processor configured to execute computer-readable instructions included in a memory. The live broadcast method may include, by the at least one processor, receiving, from at least one guest terminal through a server, a guest broadcast corresponding to a broadcast of the guest terminal, and transmitting, to the guest terminal and at least one viewer terminal, a live broadcast in which a host broadcast corresponding to a broadcast of the terminal and the guest broadcast are mixed. The transmitting may include transmitting, as a video stream of the live broadcast, a broadcast screen in which a host screen and a guest screen are mixed through a single video elementary stream, and transmitting, as an audio of the live broadcast, a host audio and a guest audio through the respective audio elementary streams.

In response to the terminal specifying a plurality of guest terminals, the transmitting may include transmitting, as a video stream of the live broadcast, a broadcast screen in which the host screen and a plurality of guest screens are mixed through the single video elementary stream, and transmitting, as audio streams of the live broadcast, the host audio and a plurality of guest audios received from the plurality of guest terminals through the respective audio elementary streams.

According to an aspect of at least one example embodiment, there is provided a non-transitory computer-readable record medium storing instructions that, when executed by a processor, cause the processor to perform the live broadcast method.

According to an aspect of at least one example embodiment, there is provided a terminal implemented as a computer system, the terminal including a memory; and at least one processor configured to connect to the memory and to execute computer-readable instructions included in the memory. The at least one processor is further configured to transmit, to a host terminal through a server, a first guest screen input from an input device connected to the terminal and a first guest audio associated with the first guest screen, receive, from the host terminal through the server, a first broadcast screen in which a first host screen input from the host terminal and the first guest screen are mixed and a first host audio associated with the first host screen and the first guest audio through respective audio elementary streams, generate a second broadcast screen by overlaying, on the received first broadcast screen, a second guest screen input from the input device of the terminal after the first guest screen, and play the first host audio and the second broadcast screen together without playing the first guest audio.

According to an aspect of at least one example embodiment, there is provided a terminal implemented as a computer system, the terminal including a memory; and at least one processor configured to connect to the memory and to execute computer-readable instructions included in the memory. The at least one processor is further configured to receive, from at least one guest terminal through a server, a guest broadcast corresponding to a broadcast of the guest terminal, transmit, to the guest terminal and at least one viewer terminal, a live broadcast in which a host broadcast corresponding to a broadcast of the terminal and the guest broadcast are mixed, transmit, as a video stream of the live broadcast, a broadcast screen in which a host screen and a guest screen are mixed through a single video elementary stream, and transmit, as an audio of the live broadcast, a host audio and a guest audio through the respective audio elementary streams.

Further areas of applicability will become apparent from the description provided herein. The description and specific examples in this summary are intended for purposes of illustration only and are not intended to limit the scope of the present disclosure.

DETAILED DESCRIPTION

Figure 1:
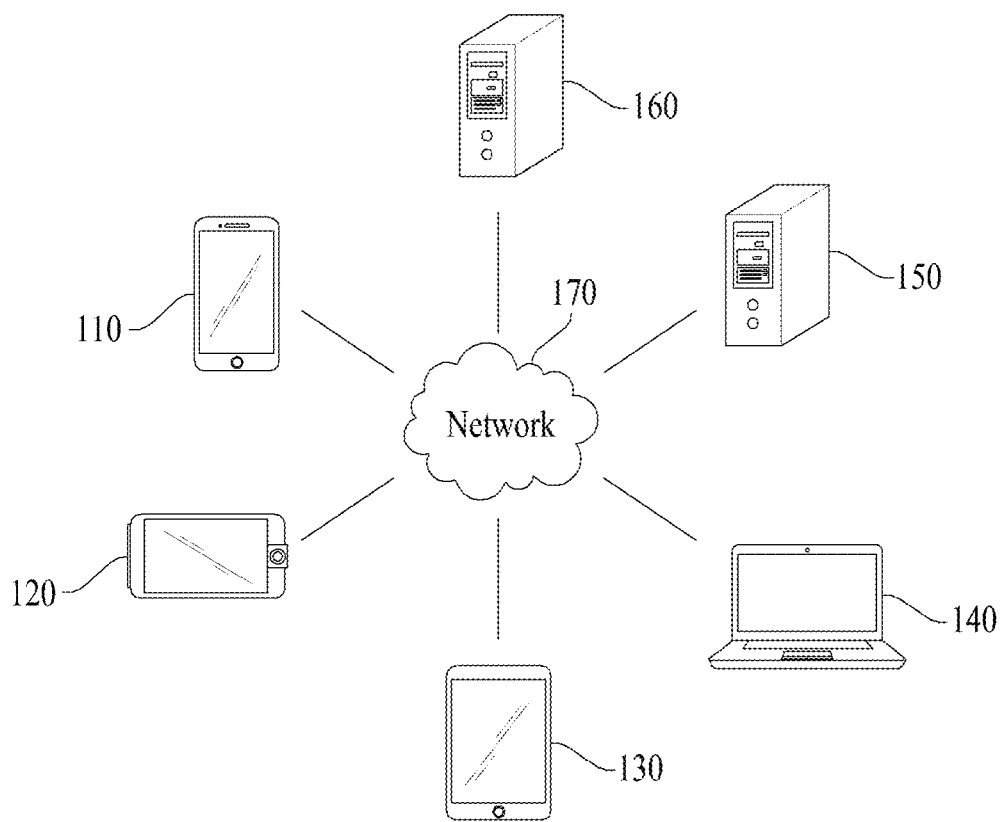
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

Some example embodiments relate to technology for solving a delay that occurs in a live broadcast.

Some example embodiments of the disclosure described in detail herein may remove a delay of a guest broadcast that occurs at a guest end in a simultaneous live broadcast and through this, may achieve many advantages in terms of efficiency, resource saving, availability, convenience, cost saving, and the like. Here, the term "simultaneous live broadcast" refers to a live broadcast that simultaneously transmits a broadcast of a single broadcasting station to another broadcasting station.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a fixed terminal or a mobile terminal that is configured as a computer system. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer systems capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. For example, the server 150 may provide, as the first service, a service (e.g., a live broadcast service) intended by an application through the application as a computer program installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
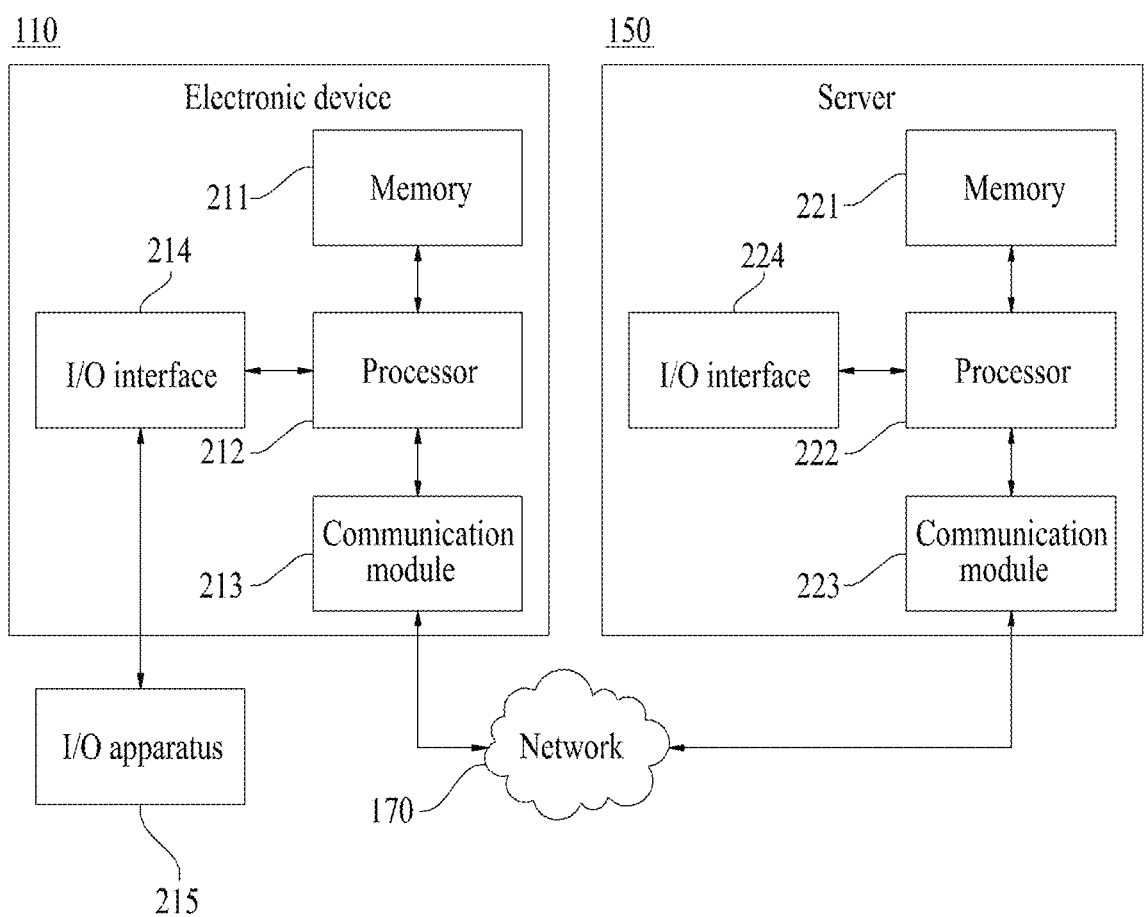
FIG. 2 is a diagram illustrating an example of an electronic device and a server according to at least one example embodiment.

FIG. 2 is a block diagram illustrating an example of an electronic device and a server according to at least one example embodiment. Description is made using the electronic device 110 as an example of an electronic device and the server 150 as an example of a server with reference to FIG. 2. Also, the other electronic devices 120, 130, and 140 or the server 160 may have the same or similar configuration as that of the electronic device 110 or the server 150.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), a read only memory (ROM), a disk drive, a solid state drive (SSD), a flash memory, etc., as a non-transitory computer-readable record medium. The permanent mass storage device, such as ROM, SSD, flash memory, and disk drive, may be included in the electronic device 110 or the server 150 as a permanent storage device separate from the memory 211, 221. Also, an OS and at least one program code, for example, a code for a browser installed and executed on the electronic device 110 or an application installed and executed on the electronic device 110 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication module 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170 and may provide a function for communication between the electronic device 110 and/or the server 150 and another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214 may be a device used for interface with an I/O apparatus 215. For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O apparatus 215 may be configured as a single device with the electronic device 110. Also, the I/O interface 224 of the server 150 may be a device for interface with an apparatus (not shown) for input or output that may be connected to the server 150 or included in the server 150. For example, when the processor 212 of the electronic device 110 processes an instruction of a computer program loaded to the memory 211, content or a service screen configured based on data provided from the server 150 or the electronic device 120 may be displayed on the display through the I/O interface 214.

According to other example embodiments, the electronic device 110 and the server 150 may include a number of components greater than or less than a number of components shown in FIG. 2. However, there is no need to clearly illustrate many components according to the related art. For example, the electronic device 110 may include at least a portion of the I/O apparatus 215, or may further include other components, for example, a transceiver, a global positioning system (GPS) module, a camera, a variety of sensors, a database (DB), and the like. In detail, if the electronic device 110 is a smartphone, the electronic device 110 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, some example embodiments of a method and system for removing a delay of a guest broadcast at a guest end in a simultaneous live broadcast are described in detail.

Figure 3:
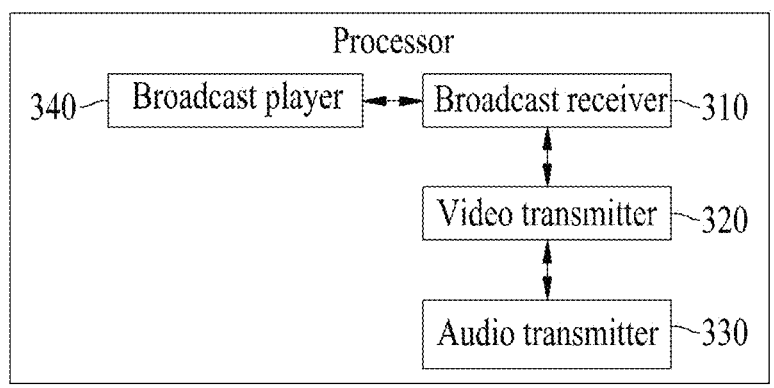
FIG. 3 is a diagram illustrating an example of components includable in a processor of an electronic device according to at least one example embodiment.
Figure 4:
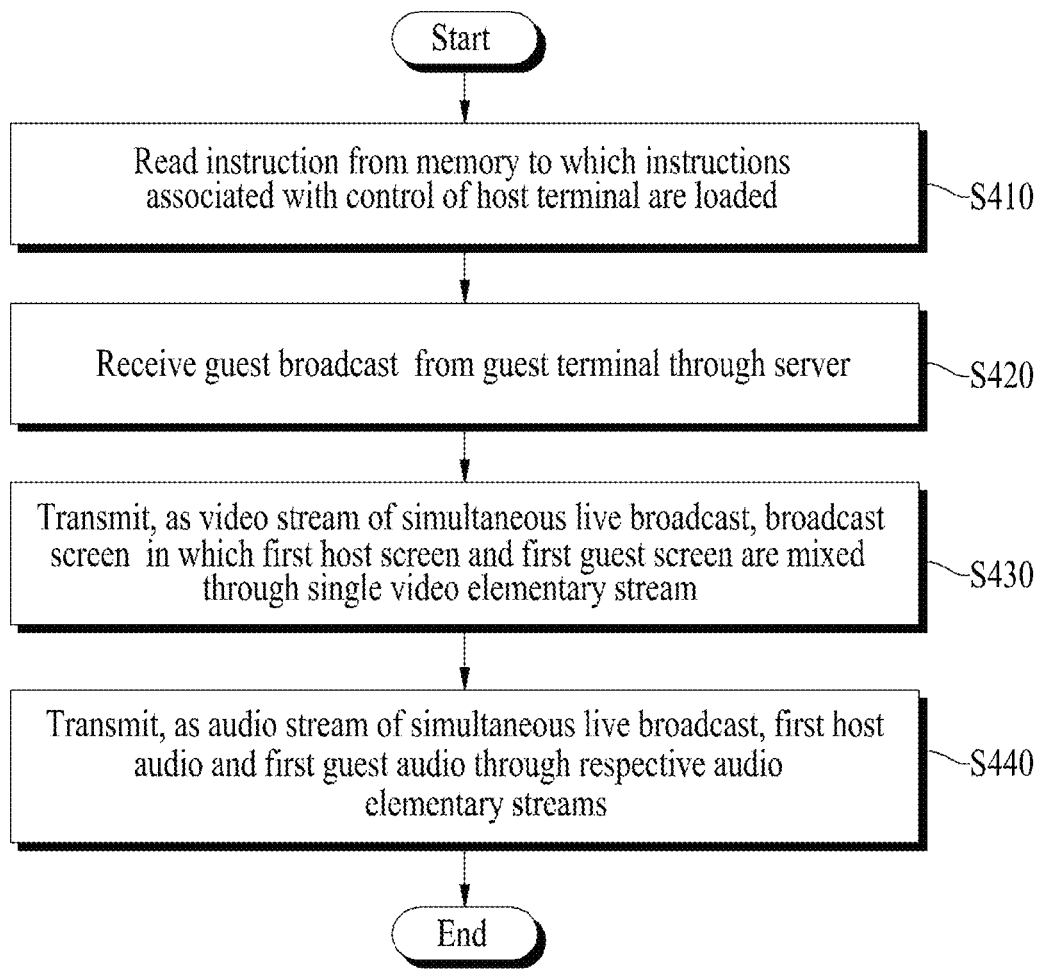
FIGS. 4 and 5 are flowcharts illustrating examples of a simultaneous live broadcast method performed by an electronic device according to at least one example embodiment.
Figure 5:
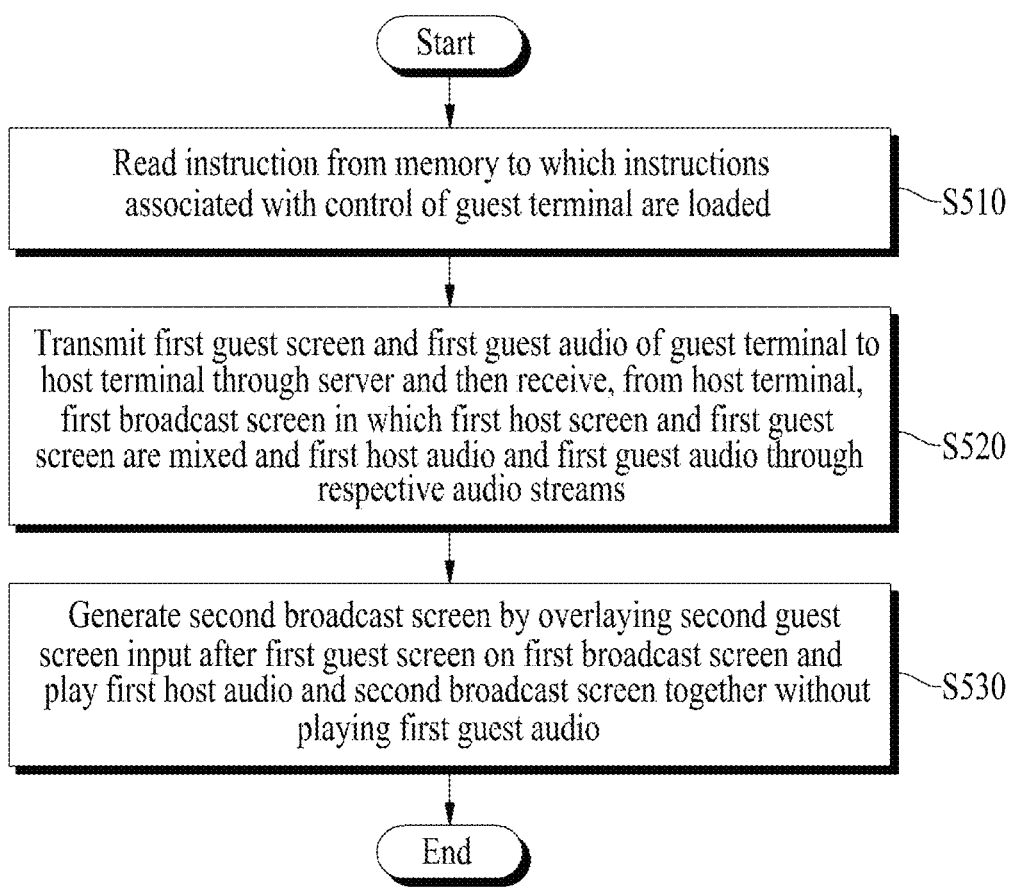

FIG. 3 is a diagram illustrating an example of components includable in a processor of an electronic device according to at least one example embodiment, and FIGS. 4 and 5 are flowcharts illustrating examples of a simultaneous live broadcast method performed by an electronic device according to at least one example embodiment.

A live broadcast system implemented as a computer may be configured in the electronic device 110 according to an example embodiment. The live broadcast system may be configured in a form of an application installed on the electronic device 110 and may provide a live broadcast service in a network environment through interaction with the server 150. For example, in response to an instruction provided from the application installed on the electronic device 110, the live broadcast system configured in the electronic device 110 may perform the simultaneous live broadcast method of FIG. 5.

The live broadcast service provides a simultaneous live broadcast in a form that a host employs at least one viewer as a guest and mixes at least one guest broadcast on a host broadcast screen and transmits a live broadcast. In this simultaneous live broadcast, a time difference occurs between a point in time of a live broadcast that a guest receives from a host and a current point in time of the guest. Therefore, the guest may experience an unnatural simultaneous live broadcast service.

Herein, proposed is technology capable of removing a delay of a guest broadcast output from a guest side in a simultaneous live broadcast.

FIG. 4 is a flowchart illustrating an example of a host-side broadcasting process in a simultaneous live broadcast according to at least one example embodiment. Referring to FIG. 3, to process the host-side broadcasting process, the processor 212 of the electronic device 110 may include a broadcast receiver 310 and a broadcast transmitter including a video transmitter 320 and an audio transmitter 330 as components. FIG. 5 is a flowchart illustrating an example of a guest-side broadcasting process in a simultaneous live broadcast according to at least one example embodiment. Referring to FIG. 3, to process the guest-side broadcasting process, the processor 212 of the electronic device 110 may include the broadcast receiver 310, the broadcast transmitter including the video transmitter 320 and the audio transmitter 330, and a broadcast player 340, as components.

Depending on example embodiments, the components of the processor 212 may be selectively included in or excluded from the processor 212. Also, depending on example embodiments, the components of the processor 212 may be separated or merged for functional representation of the processor 212.

The processor 212 and the components of the processor 212 may control the electronic device 110 to perform operations S410 to S440 and S510 to S530 included in the simultaneous live broadcast method of FIGS. 4 and 5. For example, the processor 212 and the components of the processor 212 may be configured to execute an instruction according to a code of at least one program and a code of an OS included in the memory 211.

Here, the components of the processor 212 may be representations of different functions of the processor 212 performed by the processor 212 in response to an instruction provided from a program code stored in the electronic device 110, for example, an instruction provided from an application executed on the electronic device 110. For example, the broadcast receiver 310 may be used as a functional representation of the processor 212 that controls the electronic device 110 to receive a broadcast stream for a simultaneous live broadcast in response to the instruction.

Hereinafter, the host-side broadcasting process in the simultaneous live broadcast is described with reference to FIG. 4.

Referring to FIG. 4, in operation S410, the processor 212 may read an instruction from a memory to which instructions associated with a host terminal, for example, the electronic device 110, are loaded. In this case, the read instruction may include an instruction for controlling a component of the host terminal, that is, the processor 212 to perform the following operations S420 to S440.

In operation S420, the broadcast receiver 310 may receive a live broadcast stream (hereinafter, referred to as a guest broadcast) of a guest terminal from a guest terminal, for example, the electronic device 120 through the server 150 for a simultaneous live broadcast. For example, the broadcast receiver 310 may transmit a guest participation request to at least one guest terminal specified by a user of a host terminal and may receive a guest broadcast from a guest terminal that accepts the guest participation request.

The host terminal may provide the simultaneous live broadcast by mixing a host broadcast screen and at least one guest broadcast and by transmitting a mixed broadcast to viewers including a guest. That is, in response to a request from the host terminal, the guest terminal may transmit, to the host terminal through the server 150, a guest screen (hereinafter, referred to as a first guest screen) that is input from an input device connected to the guest terminal and a guest audio (e.g., a guest audio input from the guest terminal in association with the first guest screen in a guest broadcast; hereinafter, referred to as a first guest audio) associated with the first guest screen. Accordingly, the host terminal may generate a broadcast screen (hereinafter, referred to as a first broadcast screen) in which a host screen (hereinafter, referred to as a first host screen) input from an input device connected to the host terminal and the first guest screen are mixed and then may transmit a first host audio associated with the first host screen and the first guest audio with the first broadcast screen to the guest terminal and at least one viewer terminal through the server 150.

For example, in operation S430, the video transmitter 320 may transmit, as a video stream of the simultaneous live broadcast, a broadcast screen (e.g., the first broadcast screen) in which a video stream of the host broadcast (e.g., the first host screen) and a video stream of the guest broadcast (e.g., the first guest screen) are mixed through a single video elementary stream (ES), to viewers including the guest through the server 150. That is, the video transmitter may mix the host broadcast generated at a host end and the guest broadcast received from a guest end and may transmit a mixed broadcast as the simultaneous live broadcast.

In operation S440, the audio transmitter 330 may transmit, as an audio stream of the simultaneous live broadcast, an audio stream of the host broadcast (e.g., the first host audio) and an audio stream of the guest broadcast (e.g., the first guest audio) through the respective audio elementary streams. As a method of removing a delay of the guest broadcast output from a guest side in the simultaneous live broadcast, the host end may generate a host audio stream and a guest audio stream as the respective individual elementary streams and may transmit each of the generated host audio stream and guest audio stream, without mixing in advance an audio stream of the simultaneous live broadcast.

If a plurality of guest terminals is specified by a user of the host terminal, that is, if a plurality of guests is present in a single simultaneous live broadcast, the video transmitter 320 may transmit a broadcast screen in which the first host screen and a plurality of guest screens are mixed through a single video elementary stream and the audio transmitter 330 may transmit each of the host audio and a plurality of guest audios received from the plurality of guest terminals, through each corresponding audio elementary stream.

Although not illustrated, according to another example embodiment, to remove a delay of the guest broadcast output from the guest side and to reduce burden for resource use of the guest terminal in the simultaneous live broadcast, the host end may mix in advance a host audio stream and a guest audio stream of the simultaneous live broadcast and then generate and transmit the mixed audio stream and the host audio stream as individual elementary streams.

Hereinafter, the guest-side broadcasting process in the simultaneous live broadcast is described with reference to FIG. 5.

Referring to FIG. 5, in operation S510, the processor 212 may read an instruction from a memory to which instructions associated with control of a guest terminal, for example, the electronic device 120, are loaded. In this case, the read instruction may include an instruction for controlling a component of the guest terminal, that is, a processor to perform the following operations S520 and S530.

In operation S520, the broadcast transmitter including the video transmitter 320 and the audio transmitter 330 may transmit, to a host terminal (e.g., the electronic device 110) configured to transmit a live broadcast in which a guest broadcast and a host broadcast are mixed through the server 150, a first guest screen input from an input device connected to the guest terminal and a first guest audio associated with the first guest screen. To view a simultaneous live broadcast provided from the host terminal, the broadcast receiver 310 may receive the simultaneous live broadcast from the host terminal through the server 150. Here, in the case of a video stream, the broadcast receiver 310 may receive, from the host terminal, a first broadcast screen in which a first host screen input from the host terminal and the first guest screen are mixed through a single video elementary stream. In the case of an audio stream, the broadcast receiver 310 may receive, from the host terminal, a first host audio associated with the first host screen and the first guest audio through the respective audio elementary streams. That is, in an example of receiving a host broadcast and a guest broadcast as the simultaneous live broadcast, the broadcast receiver 310 may receive a video stream in a state in which the host broadcast and the guest broadcast are mixed in advance at the host end, and may receive audio streams (e.g., a first host audio associated with the first host screen and the first guest audio) through individual elementary streams without mixing.

Although not illustrated, according to another example embodiment in which the host terminal transmits a first mixed audio (an audio in which the first host audio associated with the first host screen and the first guest audio are mixed) and the first host audio through the respective individual elementary streams, in the case of an audio stream, the broadcast receiver 310 may receive the first mixed audio and the first host audio from the host terminal through the respective elementary streams.

In operation S530, the broadcast player 340 may generate a second broadcast screen to which a guest screen of a current point in time is applied by overlaying a screen (hereinafter, referred to as a second guest screen) input at a current point time from the input device of the guest terminal on an area (hereinafter, referred to as a guest video layout) on which the first guest screen is displayed on the first broadcast screen of the simultaneous live broadcast received from the host terminal and then may play only the first host audio as a corresponding audio at the same time of playing the second broadcast screen. That is, the broadcast player 340 may ignore the first guest audio in the audio received as the audio stream of the simultaneous live broadcast and may play only the first host audio received as the audio stream of the simultaneous live broadcast.

As another example, the broadcast player 340 may generate the second broadcast screen to which the guest screen of the current point in time is applied by overlaying the second guest screen input from the input device of the guest terminal on the guest video layout of the first broadcast screen received from the host terminal, and then may mix and play the first host audio and the guest audio of the current point in time of the guest terminal, that is, the second guest audio associated with the second guest screen together with the second broadcast screen. That is, an audio of the guest terminal may be generated and played as a guest broadcast audio by ignoring the first guest audio in the audio received as the audio stream of the simultaneous live broadcast and by mixing the first host audio received as the audio stream of the simultaneous live broadcast and the second guest audio input at the current point in time to the guest terminal. That is, in playing the simultaneous live broadcast received from the host terminal, the broadcast player 340 may mix and play the first host audio and the second guest audio of the current point in time of the guest at the same time of playing the second broadcast screen on which the video of the current point in time of the guest is overlaid on the guest video layout of the first broadcast screen. Therefore, a delay of guest video and audio output from the guest side in the simultaneous live broadcast may be mitigated or prevented.

In response to an audio control request, the broadcast player 340 may control whether to play at least one audio, for example, at least one of the host audio and the guest audio of the simultaneous live broadcast. For example, the broadcast player 340 may selectively turn ON/OFF at least one audio of the simultaneous live broadcast based on an input of the server 150 or the user or setting of the server 150 or the terminal. Since the host audio and the guest audio are separated and transmitted from the host terminal through individual elementary streams, the guest terminal or the viewer terminal may receive each audio through a corresponding individual elementary stream. Accordingly, a specific audio may be turned ON/OFF in response to a selection from a user that views the simultaneous live broadcast. For example, if a plurality of guest terminals is specified by the user of the host terminal, the viewer terminal may separately receive the host audio and each of guest audios. Therefore, a viewer customized audio may be provided by mixing the host audio and an audio stream selected by a view from among the guest audios.

Although not illustrated, according to another example embodiment in which the host terminal transmits the first mixed audio (the first host audio associated with the first host screen and the first guest audio are mixed) and the first host audio through the respective individual elementary streams, the guest terminal may ignore the first mixed audio received as an audio stream of the simultaneous live broadcast and may play only the first host audio as an audio of the second broadcast screen. In contrast, according to some example embodiment, the viewer terminal may ignore the first host audio in the audio received as the audio stream of the simultaneous live broadcast and may play only the first mixed audio as an audio of the first broadcast screen.

Figure 6:
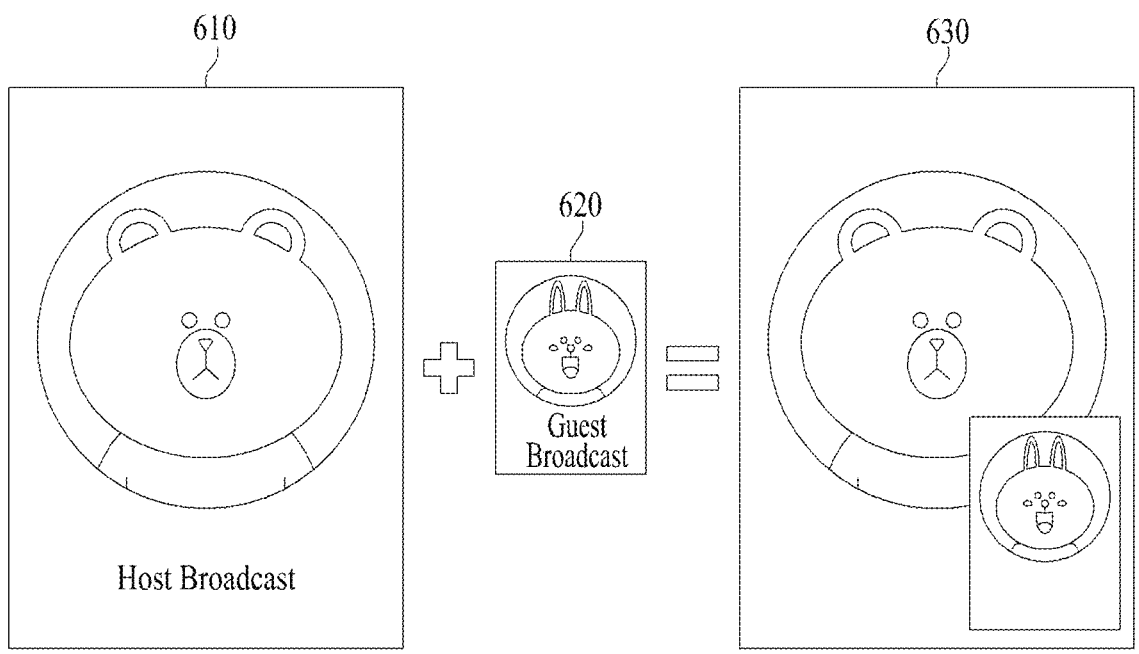
FIGS. 6 and 7 illustrate examples of describing a delay issue occurring on a guest side in a simultaneous live broadcast.
Figure 7:
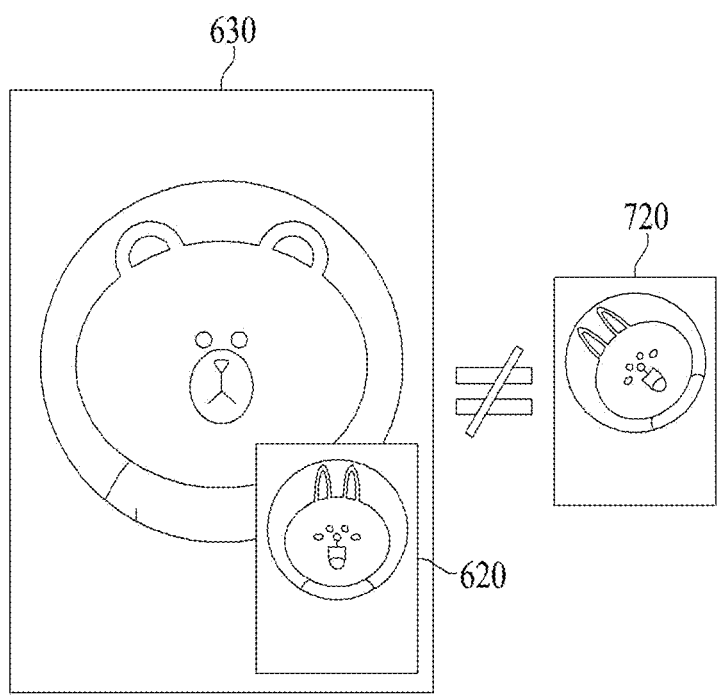

FIGS. 6 and 7 illustrate examples of describing a delay experienced on a guest side.

Referring to FIG. 6, a host terminal 600 may employ at least one viewer as a guest during a live broadcast conducted by a host, receive a guest broadcast 620 from a corresponding guest terminal, and then transmit, to all of viewers including the guest, a simultaneous live broadcast 630 in which a host broadcast 610 and the guest broadcast 620 are mixed.

Referring to FIG. 7, a guest terminal 700 may play the simultaneous live broadcast 630 transmitted from the host terminal 600. Here, a time difference between a point in time at which the guest broadcast 620 is transmitted from the guest terminal 700 to the host terminal 600 and a point in time of a current guest broadcast 720 occurs. Therefore, the guest may view the guest broadcast 620 of a previous point in time different from the point in time of the current guest broadcast 720 as is and thus, may experience an unnatural simultaneous live broadcast service.

As one of methods of solving a delay issue occurring in a guest broadcast, a single host may transmit two broadcasts. That is, the single host may transmit, to a general viewer, a broadcast in which a host broadcast and a guest broadcast are mixed, and transmit, to a guest, only the host broadcast in which the guest broadcast is not mixed. Here, a delay issue may be solved in such a manner that the guest terminal 700 may directly mix the guest broadcast of the guest terminal 700 with the host broadcast and play a mixed broadcast. However, the aforementioned method may require use of a video generation resource and a network resource since the host terminal needs to transmit two broadcasts, that is, the broadcast for the general viewer and the broadcast for the guest, although it is a single broadcast based on the broadcast contents.

Some example embodiments relate to a method for solving a delay issue and resource waste of a guest broadcast, and may generate a host audio and a guest audio as the respective individual elementary streams without mixing them in advance for a simultaneous live broadcast at a host end.

Figure 8:
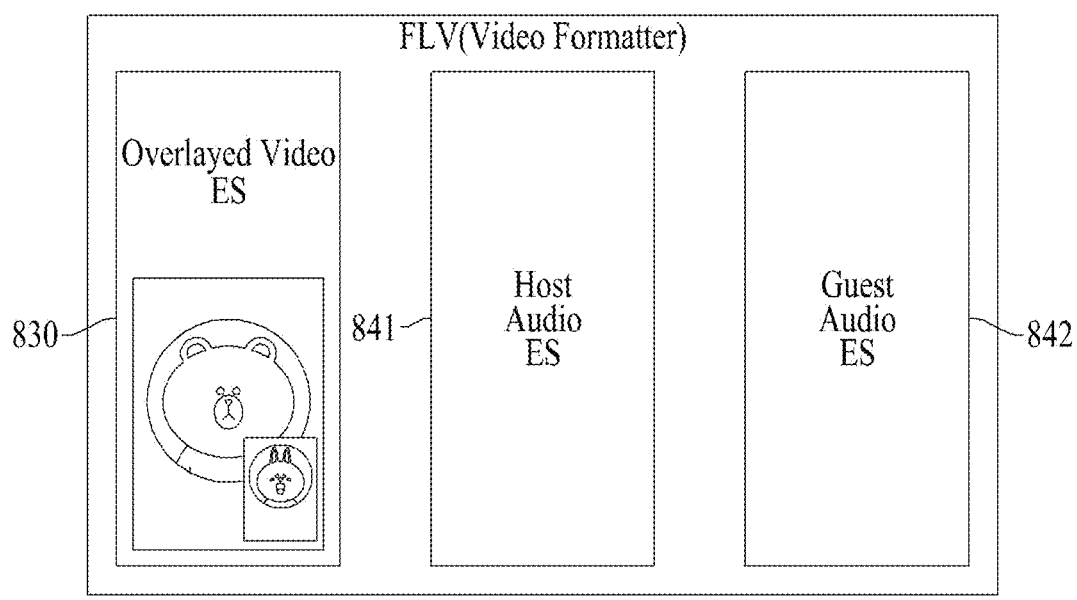
FIG. 8 illustrates an example of describing a broadcast transmission method performed by a host side according to at least one example embodiment.

For example, referring to FIG. 8, in the case of a video stream for a simultaneous live broadcast, a host terminal 800 may transmit a video stream 830 in which a first host video and a first guest video are mixed. In the case of an audio stream for the simultaneous live broadcast, the host terminal 800 may separate and transmit a first host audio 841 and a first guest audio 842 through the respective individual elementary streams without mixing.

Figure 9:
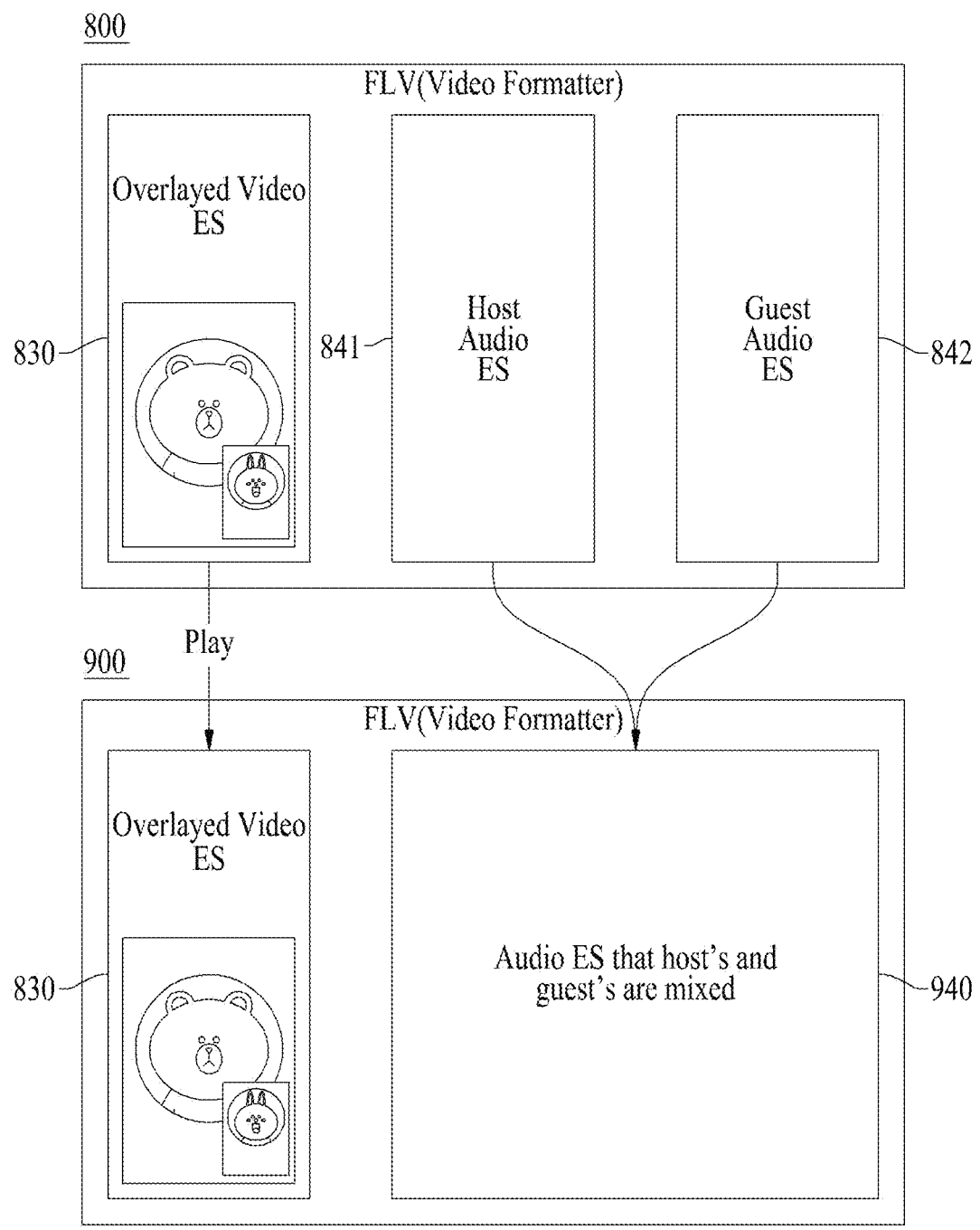
FIG. 9 illustrates an example of describing a broadcast playing method performed by a general viewer side according to at least one example embodiment.

Referring to FIG. 9, not a guest but a general viewer terminal 900 may receive, from the host terminal 800, and play as is the video stream 830 in which the first host video and the first guest video are mixed. In the case of an audio 940, the viewer terminal 900 may receive and directly mix each of the first host audio 841 and the first guest audio 842 and then play a mixed audio.

Figure 10:
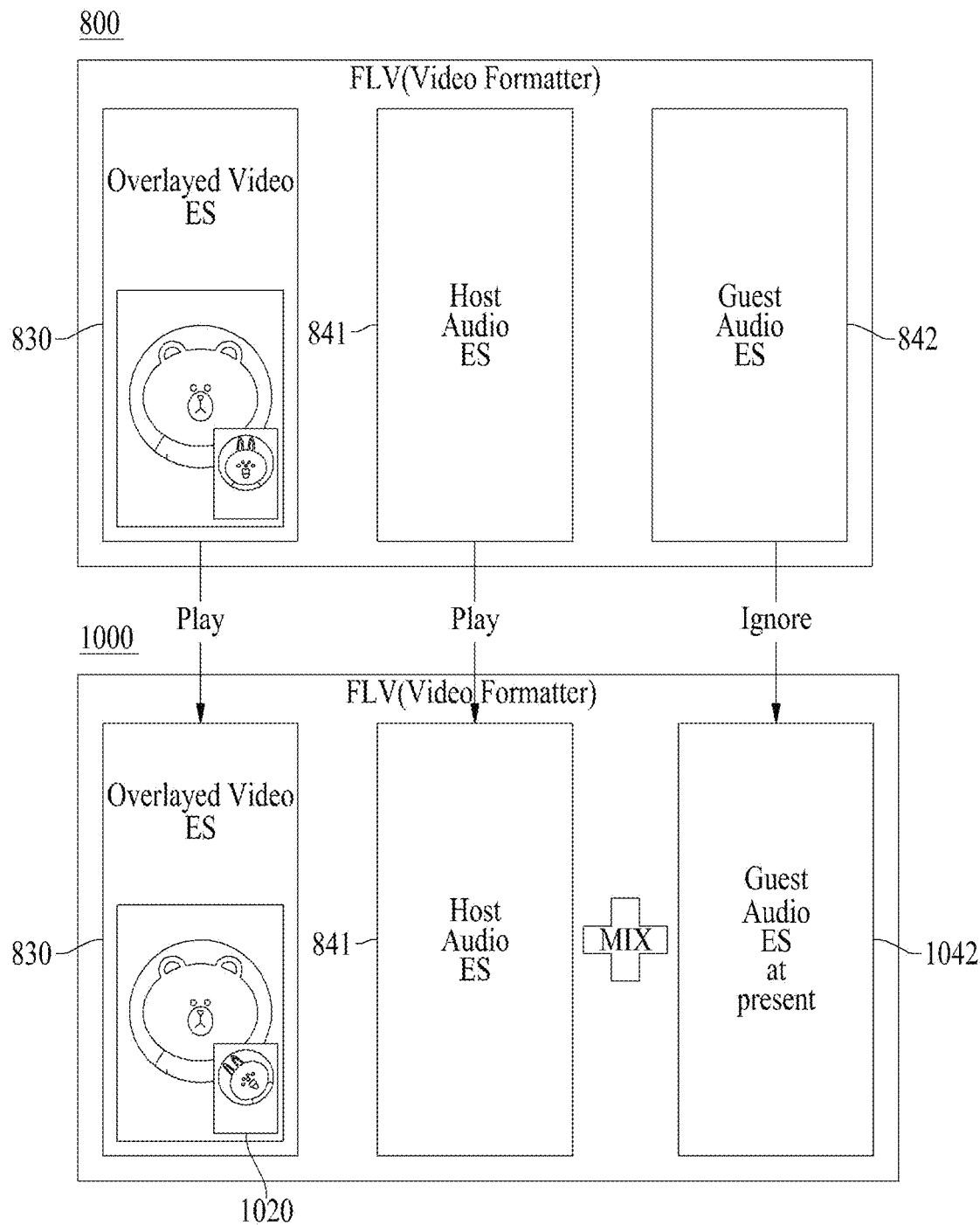
FIG. 10 illustrates an example of describing a broadcast playing method performed by a guest side according to at least one example embodiment.

Referring to FIG. 10, a guest terminal 1000 may receive, from the host terminal 800, and play the video stream 830 in which the first host video and the first guest video are mixed. Here, the guest terminal 1000 may play the video stream 830 by overlaying a second guest video 1020 that is a video of a current point in time of the guest terminal 1000 on a guest video layout. In addition, in the case of an audio, the guest terminal 1000 may play an audio by ignoring the first guest audio 842 received from the host terminal 800 and by mixing the first host audio 841 and a second guest audio 1042 that is an audio of a current point in time of the guest terminal 1000.

That is, the guest terminal 1000 may play the simultaneous live broadcast received from the host terminal 800 by overlaying the second guest video 1020 on the guest video layout of the broadcast screen and also mixing the first host audio 841 and the second guest audio 1042, such that the guest side does not recognize a delay according to the simultaneous live broadcast.

According to some example embodiments, in a simultaneous live broadcast of mixing and transmitting a host broadcast stream and a guest broadcast stream, all of a delay issue and resource waste may be mitigated or prevented by generating and transmitting an audio of a host and an audio of a guest through the respective individual elementary streams.

The systems or apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. Here, the media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed by Appstore that distributes applications or a site, a server, and the like that supplies and distributes other various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A live broadcast method executed at a terminal implemented as a computer system, the terminal comprising at least one processor configured to execute computer-readable instructions included in a memory, the live broadcast method comprising:
    by the at least one processor,
        transmitting, to a host terminal through a server, a first guest screen of a user input at an initial point in time from an input device connected to the terminal and a first guest audio associated with the first guest screen;
        receiving, from the host terminal through the server, (1) a first broadcast screen, in which a first host screen input from the host terminal and the first guest screen are mixed, and (2) a first host audio associated with the first host screen and the first guest audio through respective audio elementary streams;
        generating a second broadcast screen, based on the first broadcast screen and a second guest screen, by obscuring a video of the first guest screen with a video of the second guest screen in the received first broadcast screen, the second guest screen of the same user being input at a current point in time, which is later than the initial point in time, from the input device of the terminal; and
        playing the second broadcast screen together with the first host audio and a second guest audio, without playing the first guest audio, the second guest audio being associated with the second guest screen.

2. The live broadcast method of claim 1, wherein the playing comprises,
    generating a guest broadcast audio by mixing a second guest audio and the received first host audio, and
    playing the guest broadcast audio and the second broadcast screen together.

3. The live broadcast method of claim 1, wherein the receiving comprises:
    receiving, as a video stream of a live broadcast, the first broadcast screen in which the first host screen and the first guest screen are mixed through a single video elementary stream.

4. The live broadcast method of claim 3, wherein
    the live broadcast transmitted from the host terminal includes another guest screen from another terminal that is mixed with the second guest screen and the first broadcast screen, and
    the receiving comprises further receiving, as another audio stream of the live broadcast, another guest audio associated with the another guest screen through another audio elementary stream different from the respective audio elementary streams.

5. The live broadcast method of claim 3, wherein the playing comprises controlling whether to play at least one of the respective audio elementary streams with respect to the live broadcast.

6. The live broadcast method of claim 4, wherein the playing comprises controlling whether to play at least one of the respective audio elementary streams and the another audio elementary stream with respect to the live broadcast.

7. A live broadcast method executed at a terminal implemented as a computer system, the terminal comprising at least one processor configured to execute computer-readable instructions included in a memory, the live broadcast method comprising:

by the at least one processor,
receiving, from at least one guest terminal through a server, a guest broadcast corresponding to a broadcast of the guest terminal at an initial point in time, the guest broadcast including a first guest screen and a first guest audio in association with the first guest screen;
transmitting, to the guest terminal and at least one viewer terminal, a live broadcast in which a host broadcast corresponding to a broadcast of the terminal and the guest broadcast are mixed, the transmitting including,
  transmitting, as a video stream of the live broadcast, a first broadcast screen in which a host screen and the first guest screen are mixed through a single video elementary stream, and
  transmitting, as an audio of the live broadcast, a host audio and the first guest audio through respective audio elementary streams;
causing the guest terminal to
  generate a second broadcast screen, based on the first broadcast screen and a second guest screen by obscuring a video of the first guest screen with a video of the second guest screen in the first broadcast screen received from the terminal, the second guest screen being input at a current point in time, which is later than the initial point in time, from the same guest terminal, and
  play the second broadcast screen together with the host audio and a second guest audio, without playing the first guest audio, the second guest audio being associated with the second guest screen; and
causing the at least one viewer terminal to play the first broadcast screen together with the host audio and the first guest audio.

8. The live broadcast method of claim 7, wherein, in response to the terminal specifying a plurality of guest terminals, the transmitting comprises:
  transmitting, as the video stream of the live broadcast, a broadcast screen in which the host screen, and a plurality of guest screens are mixed through the single video elementary stream; and
  transmitting, as audio streams of the live broadcast, the host audio and a plurality of guest audios received from the plurality of guest terminals through the respective audio elementary streams.

9. A non-transitory computer-readable record medium storing instructions that, when executed by a processor, cause a terminal including, the processor to perform the live broadcast method of claim 1.

10. A terminal implemented as a computer system, the terminal comprising:
  a memory; and
  at least one processor configured to connect to the memory and to execute computer-readable instructions included in the memory such that the at least one processor is configured to cause the terminal to,
  transmit, to a host terminal through a server, a first guest screen of a user input at an initial point in time from am input device connected to the terminal and a first guest audio associated with the first guest screen;
  receive, from the host terminal through the server, (1) a first broadcast screen, in which a first host screen input from the host terminal and the first guest screen are mixed, and (2) a first host audio associated with the first host screen and the first guest audio through respective audio elementary streams;
  generate a second broadcast screen, based on the first broadcast screen and a second guest screen, by obscuring a video of the first guest screen with a video of the second guest screen in the received first broadcast screen, the second guest screen of the same user being input at a current point in time, which is later than the initial point in time, from the input device of the terminal; and
  play the second broadcast screen together with the first host audio and a second guest audio, without playing the first guest audio, the second guest audio being associated with the second guest screen.

11. The terminal of claim 10, wherein the at least one processor is further configured to cause the terminal to,
  generate a guest broadcast audio by mixing the second guest audio and the received first host audio, and
  play the guest broadcast audio and the second broadcast screen together.

12. The terminal of claim 10, wherein the at least one processor is further configured to cause the terminal to,
  generate, as a video stream of a live broadcast, the second broadcast screen in which the first host screen and the second guest screen are mixed through a single video elementary stream, and
  receive, as audio streams of the live broadcast, the first host audio and the first guest audio through the respective audio elementary streams.

13. The terminal of claim 12, wherein
  the live broadcast transmitted from the host terminal includes another guest screen from another terminal mixed with the second guest screen and the first host screen, and
  receive, as another audio stream of the live broadcast, another guest audio associated the another guest screen through another audio elementary stream different from the respective audio elementary streams.

14. The terminal of claim 12, wherein the at least one processor is further configured to cause the terminal to control whether to play at least one of the respective audio elementary streams with respect to the live broadcast.

15. The terminal of claim 13, wherein the at least one processor is further configured to cause the terminal to control whether to play at least one of the respective audio elementary streams and the another audio elementary stream with respect to the live broadcast.

16. A terminal implemented as a computer system, the terminal comprising:
  a memory; and
  at least one processor configured to connect to the memory and to execute computer-readable instructions included in the memory such that the at least one processor is configured to cause the terminal to,
  receive, from at least one guest terminal through a server, a guest broadcast corresponding to a broadcast of the guest terminal at an initial point in time, the guest broadcast including a first guest screen and a first guest audio in association with the first guest screen,
  transmit, to the guest terminal and at least one viewer terminal, a live broadcast, in which a host broadcast corresponding to a broadcast of the terminal and the guest broadcast are mixed by
    transmitting, as a video stream of the live broadcast, a first broadcast screen in, which a host screen and the first guest screen are mixed through a single video elementary stream, and
    transmitting, as an audio of the live broadcast, a host audio and the first guest audio through respective audio elementary streams, generate a second broadcast screen, based on the first broadcast screen and a second guest screen by obscuring a video of the first guest screen with a video of the second guest screen in the first broadcast screen received from the terminal, the second guest screen being input at a current point in time, which is later than the initial point in time, from the same guest terminal, play the second broadcast screen together with the host audio and a second guest audio, without playing the first guest audio, the second guest audio being associated with the second guest screen, and cause the at least one viewer terminal to play the first broadcast screen together with the host a audio and the first guest audio.

17. The terminal of claim 16, wherein, in response to the terminal specifying a plurality of guest terminals, the at least one processor is further configured to cause the terminal to, transmit, as the video stream of the live broadcast, a broadcast screen in which the host screen and a plurality of guest screens are mixed through the single video elementary stream, and transmit, as audio streams of the live broadcast, the host audio and a plurality of guest audios received from the plurality of guest terminals through respective audio elementary streams.

* * * * *